United States Patent
Krause et al.

(10) Patent No.: US 8,350,505 B2
(45) Date of Patent: Jan. 8, 2013

(54) METHOD FOR ASCERTAINING A CORRECTION VALUE FOR THE ANGLE OF THE ROTOR OF AN ELECTRICALLY COMMUTED REVERSIBLE SYNCHRONOUS MOTOR

(75) Inventors: Uwe Krause, Pattensen (DE); Uwe Nolte, Barsinghausen (DE); Jan Spannberger, Neustadt am Rübenberge (DE)

(73) Assignee: Siemens Aktiengesellschaft, Munich (DE)

( * ) Notice: Subject to any disclaimer, the term of this patent is extended or adjusted under 35 U.S.C. 154(b) by 262 days.

(21) Appl. No.: 12/735,607

(22) PCT Filed: Jan. 28, 2009

(86) PCT No.: PCT/EP2009/050929
§ 371 (c)(1),
(2), (4) Date: Aug. 2, 2010

(87) PCT Pub. No.: WO2009/095397
PCT Pub. Date: Aug. 6, 2009

(65) Prior Publication Data
US 2011/0001444 A1 Jan. 6, 2011

(30) Foreign Application Priority Data
Jan. 31, 2008 (DE) .......................... 10 2008 006 983

(51) Int. Cl.
*H02P 6/06* (2006.01)
*H02P 6/00* (2006.01)
*H02P 6/16* (2006.01)
*H02P 23/12* (2006.01)
*H02P 7/00* (2006.01)

(52) U.S. Cl. ......... 318/400.06; 318/400.01; 318/400.04; 318/400.14; 318/434

(58) Field of Classification Search ............. 318/400.01, 318/400.04, 400.06, 400.14, 434
See application file for complete search history.

(56) References Cited

U.S. PATENT DOCUMENTS
4,864,198 A * 9/1989 Takase et al. ............ 318/400.01
(Continued)

FOREIGN PATENT DOCUMENTS
EP    0 571 076 A1    11/1993
EP    0 571 076 B1    1/1996

OTHER PUBLICATIONS

English language International Search Report for PCT/EP2009/050929, mailed on Feb. 12, 2010.

(Continued)

*Primary Examiner* — Walter Benson
*Assistant Examiner* — Gabriel Agared
(74) *Attorney, Agent, or Firm* — Staas & Halsey LLP

(57) ABSTRACT

An electrically commuted reversible synchronous motor is activated in a calibration journey using an externally forced rotating field, during which an electrical angle of a rotating field and a mechanical angle of the rotor are measured simultaneously at a reference position by an external sensor. These items are stored associated with one another as a measurement series of value pairs. The electrical angle of the rotating field and the mechanical angle of the rotor are also detected simultaneously after direction reversal of the rotating field. These are stored as a second measurement series of value pairs. The angle difference between the electrical angle and the mechanical angle are calculated from value pairs of both measurement series. The correction value for taking the actual incorrect angle into consideration is calculated from the two angle differences by averaging.

9 Claims, 1 Drawing Sheet

U.S. PATENT DOCUMENTS

| | | | |
|---|---|---|---|
| 5,378,976 | A | 1/1995 | Inaji et al. |
| 6,046,554 | A * | 4/2000 | Becerra .................... 318/400.34 |
| 7,304,452 | B2 * | 12/2007 | Nagai et al. ................... 318/811 |
| 2003/0076060 | A1 | 4/2003 | Colosky et al. |
| 2009/0224702 | A1 * | 9/2009 | Zhu et al. ........................ 318/16 |

OTHER PUBLICATIONS

Office Action for DE 10 2008 006 983.3-32, mailed Aug. 21, 2008.
German Office Action for related German Patent Application No. 10 2008 006 983.3, issued on Jul. 11, 2011.

* cited by examiner

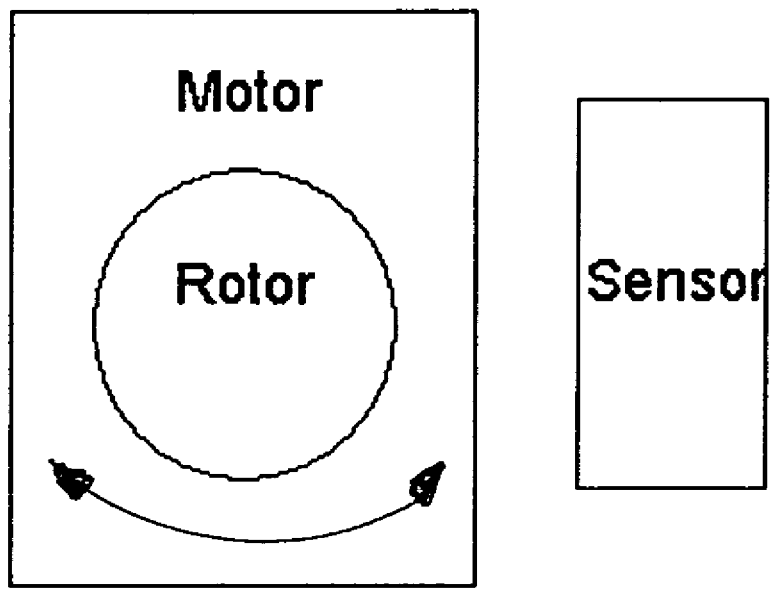

METHOD FOR ASCERTAINING A CORRECTION VALUE FOR THE ANGLE OF THE ROTOR OF AN ELECTRICALLY COMMUTED REVERSIBLE SYNCHRONOUS MOTOR

CROSS REFERENCE TO RELATED APPLICATIONS

This application is based on and hereby claims priority to PCT Application No. PCT/EP2009/050929 filed on Jan. 28, 2009 and DE Application No. 10 2008 006 983.3 filed on Jan. 31, 2008, the contents of which are hereby incorporated by reference.

BACKGROUND

The invention relates to a method for ascertaining a correction value for the angular position of the rotor of an electrically commutated reversible synchronous motor on the basis of a sensor used for driving the synchronous motor.

A sensor may be used with a permanent magnet synchronous motor in an elevator door control system. Mechanical phase displacement angles can occur during fitting of the sensor or as a result of hystereses. The error can cause inaccuracies and/or errors and result in an erroneous driving of the synchronous motor.

When driving electrically commutated synchronous motors, the exact knowledge of the rotor position in relation to the winding layer of the stator is absolutely necessary for optimum development of force with minimum noise. With a view to minimum development of noise, the motors are generally operated with sinusoidal driving and, for example, resolvers, optical and magnetic absolute value transmitters (photoelectric barriers and Hall elements) or incremental sensors with one or more indexers are used as sensors.

The position between the motor winding and the sensor is predetermined mechanically; the relative position to one another can vary as a result of fitting inaccuracies, however. A further source of fluctuating angles are hysteresis effects of the sensors used. These variations necessarily result in erroneous driving of the motor since the measured angular position and the actual angular position do not exactly correspond to one another. In particular in the case of multipolar motors, this error has a very negative effect since a mechanical fitting error with the factor of the pole pair number as an electrical phase displacement angle becomes noticeable during the driving. For example, a fitting inaccuracy of 1° in the case of a motor with ten pole pairs brings about an electrical phase displacement angle of 10°. Based on the leading angle of 90°, this already corresponds to erroneous driving of 11%. This results in a reduction in the effective torque and in an increase in the development of noise and in increased losses.

Until now, the electrical phase displacement angle has been reduced by mechanical sensor compensation or by interactive or automated (for example during manufacture) inputting of a compensation value for the angular offset into the control electronics. There are even sensors on the market which are already internally prepared for processing such an offset value. In the sector of door controllers, electrically commutated motors are still seldom used and automatic compensation methods have not yet previously been used for these motors.

SUMMARY

One potential object is therefore to provide a simple and reliable method of compensating the sensors for driving electrically commutated synchronous motors, with which method electrical phase displacement angles and erroneous driving of the motors as a result of inaccuracies and/or errors during fitting of the sensors can be reliably identified and advantageously can also be corrected in situ without any further auxiliary processing.

The present inventors propose the following:
a. that, in a calibration journey, the motor is driven by an externally forced rotating field, which is formed independently of the external sensor detecting the position of the rotor,
b. that, during the calibration journey, the electrical angle of the rotating field and the mechanical angle of the rotor measured by the external sensor are detected simultaneously at at least one reference position and are stored, in association with one another, as a first measurement series of pairs of values,
c. that the direction of the rotating field is reversed and the electrical angle of the rotating field whose direction has been reversed and the mechanical angle of the rotor measured by the external sensor are detected simultaneously and likewise stored, in association with one another, as a second measurement series of pairs of values,
d. that, preferably, once the calibration journey has come to an end, the angular difference between the electrical angle of the rotating field and the mechanical angle of the rotor measured by the external sensor is calculated from mutually corresponding pairs of values in the two measurement series, and
e. that, in a further step, the correction value for taking into consideration the actual phase displacement angle is formed from the two calculated angular differences by averaging and is stored for use for the regular operation of the motor.

During the calibration journey, the phase difference between the external rotating field and the angle detected by the external sensor is therefore determined using the properties of symmetry of the motor and the load torque at one or more reference positions. With knowledge of the phase of the forced rotating field it is possible to clearly measure this phase difference at one or more reference points using the sensor, which is fixedly connected to the rotor. For the adjustment, the absolute value of the phase difference generated merely by the load is insignificant since the measurement is performed in both directions of rotation and identical phase differences also result on symmetrical load. When taking into consideration the measured values in both directions, the phase displacement resulting from the load is compensated for and the drive value for the winding in the event of a phase displacement of zero is attained, i.e. the exact position of the rotor. The difference between the actual position of the sensor and the position provided according to the plan at this point then gives the correction value used for the phase correction, the correction value being stored in a suitable memory for use for the operation of the motor.

BRIEF DESCRIPTION OF THE DRAWINGS

These and other objects and advantages of the present invention will become more apparent and more readily appreciated from the following description of the preferred embodiments, taken in conjunction with the accompanying drawing of which:

The FIGURE is a schematic view of the proposed system.

DETAILED DESCRIPTION OF THE PREFERRED EMBODIMENT

Reference will now be made in detail to the preferred embodiments of the present invention.

The proposed method preferably provides that the calibration journey is performed in both directions of rotation with identical load torques or, in accordance with another feature of the proposed method, the motor is operated in free-running fashion without an external load during the calibration journey. As a result, the conditions of symmetry which are important for a precise result are ensured in both directions in the measurement operation.

If, as has been proposed as an alternative, the motor is operated with a known external load torque during the calibration journey, single-sided measurement journeys are also conceivable, in which case the known torque characteristics can replace the lack of symmetry.

One configuration of the method proposes that the calibration journey is integrated in the normal operating mode. This also assumes that the load torques, caused by weight and friction of the door in the case of a door drive, are known if they are not symmetrical.

If, as has been proposed, a sinusoidal voltage profile is forced upon the synchronous motor in order to produce the internally formed rotating field, the load torque is expressed as a phase difference between the rotating field and the rotor. However, the method can equally be used for non-sinusoidal (for example square-wave or trapezoidal) driving. Reliable measurement results are achieved if, in accordance with one proposal, the correction value is determined after a transient phase, i.e. if the system has stabilized and the phase difference occurring as a result of the acceleration of the load has decayed.

Asymmetric loads can be made identifiable and compensated for by evaluating further measured variables existing in the system. By measuring the total current consumption or the zero crossings in the case of block commutation, it is possible to identify non-symmetrical loads and to implement one-sided measurement journeys even without any knowledge of the motor and load conditions.

Overall, the proposed method achieves the object in a very simple manner by virtue of the motor being operated in a mode of operation which is different than the conventional mode of operation and in this way it being possible to dimension motor properties with a high degree of accuracy and little complexity without any additional sensor systems, which until now has only been possible to an insufficient extent or with a high degree of complexity.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method for ascertaining a correction value for an angular position of a rotor of an electrically commutated reversible synchronous motor based on an external sensor used to detect a position of the rotor and control driving the synchronous motor in a normal operating mode, the method comprising:

driving the synchronous motor in a forward calibration journey, by an externally forced rotating field, which is formed independently of the external sensor that detects the position of the rotor;

during the forward calibration journey, simultaneously measuring an electrical angle of the rotating field and a mechanical angle of the rotor, the mechanical angle of the rotor being measured by the external sensor, the electrical angle and the mechanical angle being measured for at least one reference position in the forward calibration journey;

determining a first angular difference between the electrical angle of the rotating field and the mechanical angle of the rotor, as measured during the forward journey;

reversing a direction of the externally forced rotating field to thereby drive the synchronous motor in a reverse calibration journey;

during the reverse calibration journey, simultaneously measuring the electrical angle of the rotating field and the mechanical angle of the rotor, the mechanical angle of the rotor being measured by the external sensor;

determining a second angular difference between the electrical angle of the rotating field and the mechanical angle of the rotor, as measured in the reverse calibration journey; and determining the correction value for an actual phase displacement angle by averaging the first and second angular differences.

2. The method as claimed in claim 1, wherein
the forward calibration journey and the reverse calibration journey are performed with identical load torques.

3. The method as claimed in claim 1, wherein
the synchronous motor is operated in a free-running fashion without an external load during the forward and reverse calibration journeys.

4. The method as claimed in claim 1, wherein
the synchronous motor is operated with a known external load torque during the forward and reverse calibration journeys.

5. The method as claimed in claim 4, wherein
the calibration journey is integrated to occur periodically during the normal operating mode of the synchronous motor.

6. The method as claimed in claim 1, wherein
an internally formed rotating field is used to drive the synchronous motor in the normal operating mode, and
a sinusoidal voltage profile is forced upon the synchronous motor in order to produce the internally formed rotating field.

7. The method as claimed in claim 1, wherein the correction value is determined after a transient phase.

8. The method as claimed in claim 1, wherein
the forward calibration journey and the reverse calibration journey are performed under asymmetric loads,
the asymmetric loads are measured, and
in determining the correction value, compensation is provided for the asymmetric loads.

9. The method as claimed in claim 1, wherein the synchronous motor is a permanent magnet synchronous motor in an elevator door control system.

* * * * *